(12) United States Patent
Kannan et al.

(10) Patent No.: US 12,287,738 B2
(45) Date of Patent: Apr. 29, 2025

(54) SYSTEM AND METHOD FOR CACHING IN STORAGE DEVICES

(71) Applicants: Samsung Electronics Co., Ltd., Suwon-si (KR); RUTGERS, THE STATE UNIVERSITY OF NEW JERSEY, New Brunswick, NJ (US)

(72) Inventors: Sudarsun Kannan, Rahway, NJ (US); Yujie Ren, Piscataway, NJ (US); Rekha Pitchumani, Herndon, VA (US)

(73) Assignees: Samsung Electronics Co., Ltd., Yongin-si (KR); RUTGERS, THE STATE UNIVERSITY OF NEW JERSEY

(*) Notice: Subject to any disclaimer, the term of this patent is extended or adjusted under 35 U.S.C. 154(b) by 51 days.

(21) Appl. No.: 17/817,640

(22) Filed: Aug. 4, 2022

(65) Prior Publication Data

US 2023/0409483 A1    Dec. 21, 2023

Related U.S. Application Data

(60) Provisional application No. 63/352,976, filed on Jun. 16, 2022.

(51) Int. Cl.
*G06F 12/0891* (2016.01)
*G06F 3/06* (2006.01)

(52) U.S. Cl.
CPC ........ *G06F 12/0891* (2013.01); *G06F 3/0604* (2013.01); *G06F 3/0655* (2013.01); *G06F 3/0673* (2013.01); *G06F 2212/60* (2013.01); *G06F 2212/70* (2013.01)

(58) Field of Classification Search
CPC .... G06F 3/0604; G06F 3/0655; G06F 3/0673; G06F 12/0891
See application file for complete search history.

(56) References Cited

U.S. PATENT DOCUMENTS

| | | | |
|---|---|---|---|
| 5,642,501 A | 6/1997 | Doshi et al. | |
| 5,909,540 A | 6/1999 | Carter et al. | |
| 5,996,047 A | 11/1999 | Peacock | |
| 6,023,706 A | 2/2000 | Schmuck et al. | |
| 6,032,216 A | 2/2000 | Schmuck et al. | |
| 6,442,682 B1 | 8/2002 | Pothapragada et al. | |
| 6,990,493 B1 * | 1/2006 | Bulka | G06F 16/10 |
| 7,249,219 B1 | 7/2007 | Mowat et al. | |

(Continued)

FOREIGN PATENT DOCUMENTS

| | | |
|---|---|---|
| CN | 104750621 B | 4/2018 |
| CN | 111241040 A | 6/2020 |

(Continued)

*Primary Examiner* — Tarek Chbouki
(74) *Attorney, Agent, or Firm* — Lewis Roca Rothgerber Christie LLP

(57) ABSTRACT

A system and method for caching in storage devices. In some embodiments, the method includes: opening a first file, by a first thread; reading a first page of data, from the first file, into a page cache in host memory of a host; adding, to a first data structure, a first pointer, the first pointer pointing to the first page of data; opening a second file, by a second thread; reading a second page of data, from the second file, into the page cache; and adding, to the first data structure, a second pointer, the second pointer pointing to the second page of data.

20 Claims, 4 Drawing Sheets

(56) References Cited

U.S. PATENT DOCUMENTS

| | | |
|---|---|---|
| 7,996,445 B2 | 8/2011 | Fair et al. |
| 8,204,871 B1 | 6/2012 | Pawar et al. |
| 8,510,510 B1 | 8/2013 | Patil et al. |
| 9,727,479 B1 * | 8/2017 | Armangau ............ G06F 12/123 |
| 10,235,293 B2 | 3/2019 | Patel et al. |
| 10,318,480 B2 | 6/2019 | Dar et al. |
| 10,318,649 B2 | 6/2019 | Deshpande et al. |
| 10,467,190 B2 | 11/2019 | Patel et al. |
| 10,503,692 B2 | 12/2019 | Wideman et al. |
| 2003/0191745 A1 * | 10/2003 | Jiang ...................... G06F 16/10 |
| 2006/0026364 A1 * | 2/2006 | Haswell ............... G06F 12/0862 |
| | | 711/E12.019 |
| 2006/0265373 A1 * | 11/2006 | McKenney ............. G06F 9/526 |
| 2007/0033374 A1 * | 2/2007 | Sinclair ............... G06F 12/0246 |
| | | 711/E12.008 |
| 2010/0011037 A1 * | 1/2010 | Kazar ................... G06F 3/0619 |
| | | 707/E17.01 |
| 2015/0006787 A1 * | 1/2015 | Liu ....................... G06F 3/0604 |
| | | 711/103 |
| 2018/0288154 A1 * | 10/2018 | Ghazaleh ............... G06F 3/0659 |
| 2021/0374105 A1 * | 12/2021 | Kodama ............... G06F 16/152 |
| 2022/0027327 A1 | 1/2022 | Zhou et al. |
| 2022/0129494 A1 * | 4/2022 | Mallick ................ G06F 16/172 |
| 2022/0300163 A1 * | 9/2022 | Jose ....................... G06F 3/0679 |
| 2023/0236971 A1 | 7/2023 | Chen et al. |

FOREIGN PATENT DOCUMENTS

| | | |
|---|---|---|
| KR | 10-2278583 B1 | 7/2021 |
| WO | 2022/068760 A1 | 4/2022 |

\* cited by examiner

SYSTEM AND METHOD FOR CACHING IN STORAGE DEVICES

CROSS-REFERENCE TO RELATED APPLICATION(S)

The present application claims priority to and the benefit of U.S. Provisional Application No. 63/352,976, filed Jun. 16, 2022, entitled "SYSTEM AND METHOD TO IMPROVE FILE CACHE HIT RATE BY GROUPING FILES", the entire content of which is incorporated herein by reference.

FIELD

One or more aspects of embodiments according to the present disclosure relate to computing systems, and more particularly to a system and method for caching in storage devices.

BACKGROUND

When data is read from persistent storage by a host, the host may cache data in host memory, and, in some circumstances, the host may prefetch data. The extent to which data are cached may affect the cache hit rate (the fraction of cache read accesses that succeed) and the performance of applications running on the host.

It is with respect to this general technical environment that aspects of the present disclosure are related.

SUMMARY

According to an embodiment of the present disclosure, there is provided a method, including: opening a first file, by a first thread; reading a first page of data, from the first file, into a page cache in host memory of a host; adding, to a first data structure, a first pointer, the first pointer pointing to the first page of data; opening a second file, by a second thread; reading a second page of data, from the second file, into the page cache; and adding, to the first data structure, a second pointer, the second pointer pointing to the second page of data.

In some embodiments, the method further includes: modifying, by the host, data in the first page of data; and moving the first pointer to a second data structure, different from the first data structure.

In some embodiments, the method further includes: flushing the first page to the first file; and moving the first pointer to the first data structure.

In some embodiments, the first thread is a member of a first control group, and the second thread is a member of the first control group.

In some embodiments, the page cache is part of a memory budget of the first control group.

In some embodiments, the first file is within a first directory, and the second file is within the first directory.

In some embodiments, the method further includes receiving a request, from the second thread, to group the second file with the first file.

In some embodiments, the method further includes: opening a third file, by the first thread; reading a third page of data, from the third file, into the page cache; and adding, to a first data structure, a pointer to the third page of data.

In some embodiments, the method further includes receiving a request, from the first thread, to group the third file with the first file.

According to an embodiment of the present disclosure, there is provided a system, including: a processing circuit; and memory, operatively connected to the processing circuit and storing instructions that, when executed by the processing circuit, cause the system to perform a method, the method including: opening a first file, by a first thread; reading a first page of data, from the first file, into a page cache in host memory of a host; adding, to a first data structure, a first pointer, the first pointer pointing to the first page of data; opening a second file, by a second thread; reading a second page of data, from the second file, into the page cache; and adding, to the first data structure, a second pointer, the second pointer pointing to the second page of data.

In some embodiments, the method further includes: modifying, by the host, data in the first page of data; and moving the first pointer to a second data structure, different from the first data structure.

In some embodiments, the method further includes: flushing the first page to the first file; and moving the first pointer to the first data structure.

In some embodiments, the first thread is a member of a first control group, and the second thread is a member of the first control group.

In some embodiments, the page cache is part of a memory budget of the first control group.

In some embodiments, the first file is within a first directory, and the second file is within the first directory.

In some embodiments, the method further includes receiving a request, from the second thread, to group the second file with the first file.

In some embodiments, the method further includes: opening a third file, by the first thread; reading a third page of data, from the third file, into the page cache; and adding, to a first data structure, a pointer to the third page of data.

In some embodiments, the method further includes receiving a request, from the first thread, to group the third file with the first file.

According to an embodiment of the present disclosure, there is provided a system, including: means for processing; and memory, operatively connected to the means for processing and storing instructions that, when executed by the means for processing, cause the system to perform a method, the method including: opening a first file, by a first thread; reading a first page of data, from the first file, into a page cache in host memory of a host; adding, to a first data structure, a first pointer, the first pointer pointing to the first page of data; opening a second file, by a second thread; reading a second page of data, from the second file, into the page cache; and adding, to the first data structure, a second pointer, the second pointer pointing to the second page of data.

In some embodiments, the method further includes: modifying, by the host, data in the first page of data; and moving the first pointer to a second data structure, different from the first data structure.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1:
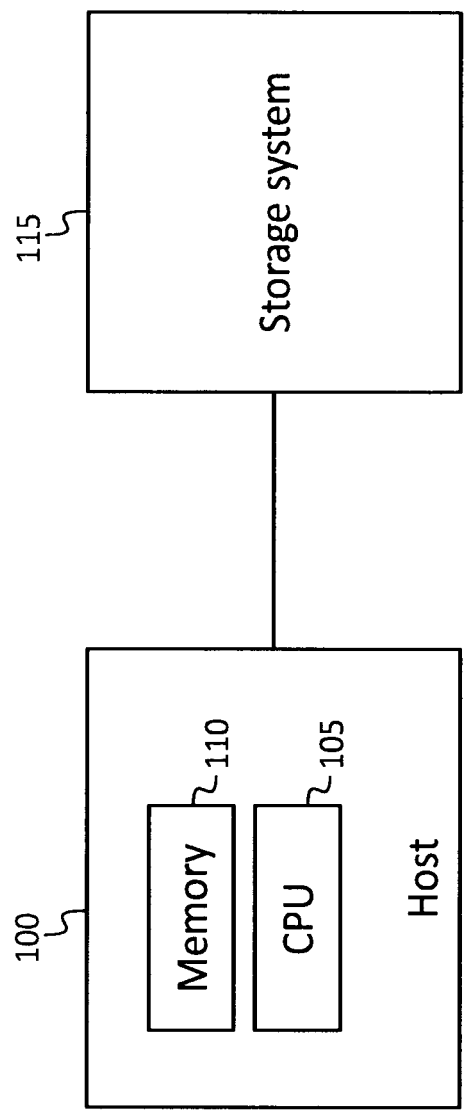
FIG. 1 is a block diagram of a system for computing, including a host and a storage system, according to an embodiment of the present disclosure.

The detailed description set forth below in connection with the appended drawings is intended as a description of exemplary embodiments of a system and method for caching in storage devices provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In a computing system in which a host is connected to persistent storage, the host may send write and read commands to the persistent storage (e.g., local persistent storage or persistent storage on a storage server that is physically separated from the host server), which may, in response, store data sent by the host or retrieve data and send it to the host. Such operations may be significantly slower than analogous operations that the host may perform in host memory (e.g., dynamic random access memory (DRAM)). For example, writing to host memory may be substantially faster (both in terms of throughput and in terms of latency) than writing to persistent storage, and reading from host memory may be substantially faster (both in terms of throughput and in terms of latency) than reading from persistent storage.

As such, to improve performance, the host may maintain a cache (which may be referred to as a "page cache"), in host memory, of a portion of the data in persistent storage. After the page cache is established, when the host requests data from persistent storage, the page cache is first checked for the data. If the data is present in the page cache (a circumstance that may be referred to as a "page cache hit", or simply a "cache hit") the data is retrieved from the page cache, avoiding a need to perform a read operation from persistent storage. If the data is absent from the page cache (a circumstance that may be referred to as a "page cache miss" or simply a "cache miss") the data is retrieved from persistent storage and returned to the host (the data may also be stored in the page cache at this time).

In part because host memory, as mentioned above, may exhibit significantly superior performance (in terms of speed) to that of persistent storage, the greater the proportion of page cache hits is, the better the overall performance of an application running on the host may be. As such, a system and method for improving page cache performance may improve the performance of applications running on the host.

In some operating systems, e.g., in a Linux operating system, the rate of page cache hits and the performance of the page cache may be affected by whether a file is a private file (accessible only by one thread) or a shared file (accessible by a plurality of threads). As used herein a "thread" is the smallest sequence of programmed instructions that can be managed independently by a scheduler. For example, as discussed in further detail below, the page cache hit rate may be about 47% for private files and about 90% for shared files, an improvement of nearly 100% if shared files are used instead of private files.

As such, in some embodiments, a shared page cache data structure is used for a group of two or more files, to obtain the performance improvement seen for shared files. The shared page cache data structure may be used for data read from persistent storage, and also for data written to persistent storage after the page cache has been flushed, e.g., after the page cache has been synchronized with the persistent storage. Various mechanisms may be used to select files for grouping. For example, files stored in persistent storage in the same directory may be grouped by default, or the application may request that certain files be grouped. As used herein, "grouping" two or more files means to arrange for the files to share a shared page cache data structure. The grouping of files may result in improved performance for applications accessing the files, e.g., as a result of an increase in cache hit rate.

FIG. 1 shows a computing system, in some embodiments. A host 100, which may include a processing circuit 105 (e.g., a central processing unit (CPU)) and a memory 110 (e.g., a DRAM memory) may be connected to a persistent storage system 115, which may share an enclosure and other elements (e.g., a power supply) with the host 100, or which may be in a separate enclosure, and which may include, for example, one or more solid state drives (SSDs). In operation, as mentioned above, the host may send write and read commands to the persistent storage, which may, in response, store data sent by the host or retrieve data and send it to the host, and the host may maintain a page cache, in host memory, storing a portion of the data in persistent storage.

Figure 2:
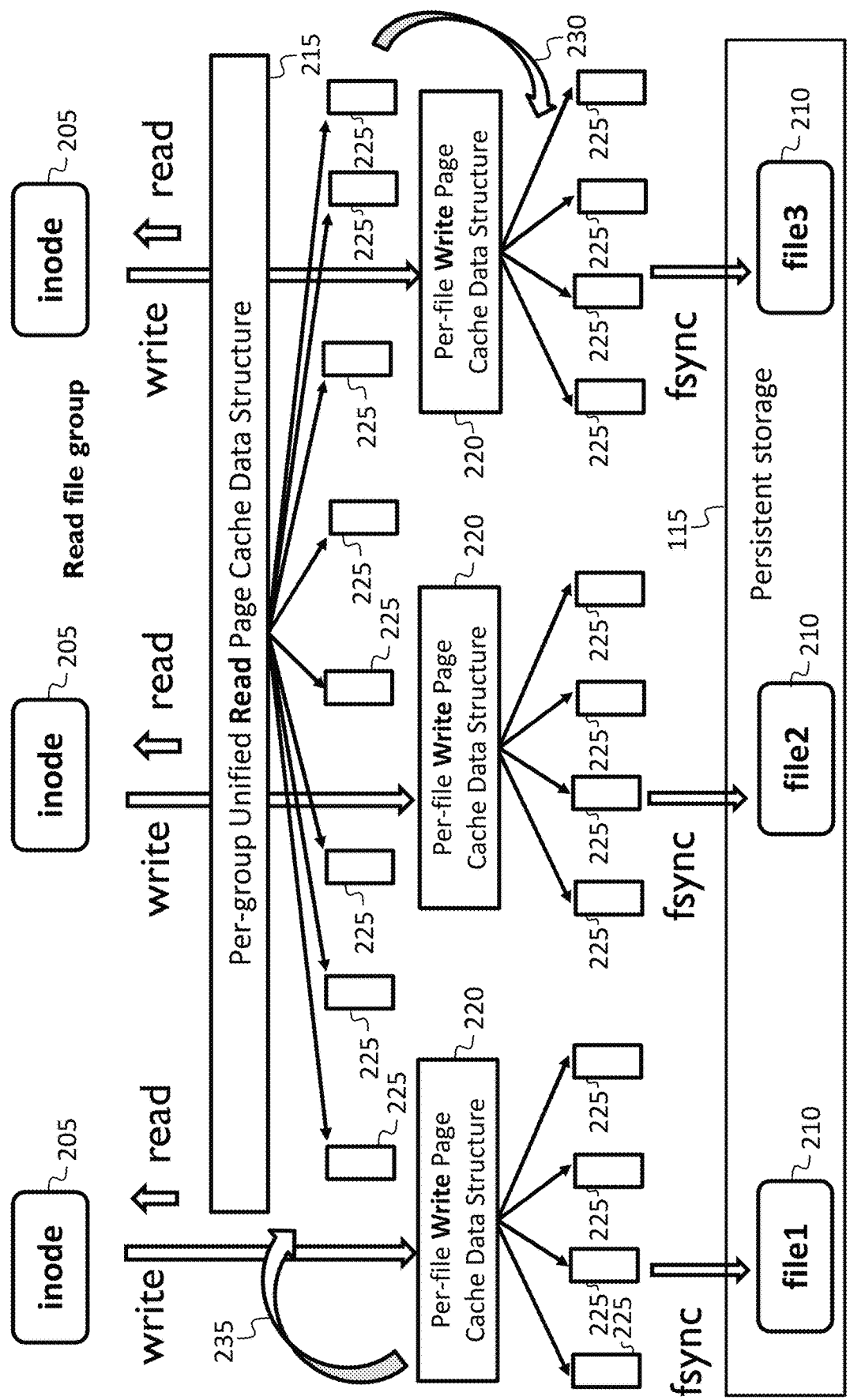
FIG. 2 is a block diagram of a system for caching file data, according to an embodiment of the present disclosure.

In operation, as mentioned above, a set of files may be grouped into a group. Such a group may be referred to as an inode (index node) group. FIG. 2 shows an organizational structure (from a file data perspective) that may be used for such an embodiment. Each of a plurality of inodes 205 (each of which corresponds to a respective file 210 in persistent storage) may have a reference (e.g., a pointer) to a page cache data structure of a plurality of data structures including a per-group unified read page cache data structure 215 and a plurality of per-file write page cache data structures 220. The memory used to store the pages of cached file data may be part of the memory budget of the group of threads (e.g., of the control group (cgroup) containing the threads, in a Linux environment) for which files are cached in the pages referenced by the per-group unified read page cache data structure 215. In some embodiments, the memory budget may be modified; e.g., an application, upon finishing a task, may return some of its memory budget to the operating system, or, if the application has more than one group associated with it, the application may move some of its memory budget from one group to another. The per-group unified read page cache data structure 215 may maintain a list of inodes 205 for which file data is cached in pages referenced by the per-group unified read page cache data structure 215. When data is modified in the page cache, the data may be marked as "dirty", because the page cache data may not be equal to the data in persistent storage until the change is synchronized with the data in persistent storage (an operation that may be referred to as "flushing"). In such a circumstance, the inode and/or the page corresponding to the modified data may be locked, to prevent, e.g., another process from reading or updating the unmodified data (which is no longer up-to-date) from persistent storage, potentially leading to erroneous results. Because of this need to lock inodes when data is modified, a separate page cache data structure may be used for each inode the data in page cache for which are dirty. This approach may avoid the locking of multiple inodes in response to the modification of data associated with any one of inodes.

For example, if a first thread running on the host (e.g., as part of an application running on the host) opens a first file and reads data from the first file, then the pages read from the first file may be returned to the thread, and the pages read from the first file (as well as possibly other pages, e.g., adjacent pages in the file) may be stored in the page cache. Pointers to the pages 225 stored in the page cache may be made part of the per-group unified read page cache data structure 215. If a second thread running on the host opens a second file and reads data from the second file, then pages from the second file may also be saved in the page cache, and pointers to the pages 225, from the second file, stored in the page cache, may be added to the per-group unified read page cache data structure 215. This sharing of the per-group unified read page cache data structure 215 may result in improved performance, e.g., in an increased page cache hit rate, as mentioned above.

Similarly, if the first thread opens a third file, and reads data from the third file, then pages from the third file may also be saved in the page cache, and pointers to the pages 225, from the third file, stored in the page cache, may be added to the per-group unified read page cache data structure 215.

When a need to cache data from a file arises, e.g., when a thread opens a new file and reads data from it, the inode for the file may be grouped with other inodes according to various criteria. For example, when a second file is in the same directory as a first file the inode for which is associated with a per-group unified read page cache data structure 215, then the second file may associated with the same per-group unified read page cache data structure 215. In some embodiments, a thread may request, upon opening a file, that the file being opened be associated with one or more other files in a per-group unified read page cache data structure 215. In some embodiments, all of the files opened by an application running on the host may be associated with a single per-group unified read page cache data structure 215. In some embodiments, an application may request that all files opened by the application be made part of one group. Such a request may be made by the application (e.g., by the threads of the application) each time a new file is opened, or a general, or "global" request may be made by the application (e.g., when the application starts, or at any time thereafter), the general request being a request that all files opened for the application be made part of one group. In some embodiments such a request may subsequently be revoked by the application. In some embodiments, an application may make per-file grouping or ungrouping requests, e.g., an application may request (i) that a file that is currently in one group be removed (and associated with a separate page cache data structure), or (ii) that a file that is currently in one group be moved to another group, or (iii) that a file that is currently not in a group be added to an existing group.

In some embodiments, grouping decisions for files may be made by a machine learning system (e.g., a suitably trained neural network). Such a machine learning system may make grouping decisions based on various file characteristics or attributes, such as, for example, (i) the respective cache hit rates of the currently open files, (ii) access times of the currently open files, (iii) access patterns, such as which files are accessed concurrently or substantially simultaneously, (iv) file sizes, (v) block addresses at which the files are stored, or (vi) whether a file is being accessed by the same thread or threads as another file. A machine learning system may also be employed to determine a suitable memory budget for the memory used to store the pages of cached file data, based on some or all of the same criteria.

Such a machine learning system may be trained using various methods. For example, operating logs, obtained during operating intervals, from a system using a variety of grouping and memory allocation methods (e.g., methods based on application requests, file locations in directories, or a partially-trained machine learning system) may be used as training data, with file characteristics or attributes being the input feature map, grouping decisions made during the operating intervals being the output feature map, and with a cost function based on access times and cache hit rates.

If one of the threads that has a file open (e.g., the second thread) then writes to a portion of the file that is cached in the page cache, the system may modify the affected pages 225 in the page cache (rendering these pages 225 dirty), move the cached pages 225 from the file to a per-file write page cache data structure 220 (as shown by the arrow 230 in FIG. 2), and lock the inode corresponding to the file. This process may make it unnecessary to lock all of the inodes for which pages 225 are cached and referenced by the per-group unified read page cache data structure 215, The moving of the pages 225 from the per-group unified read page cache data structure 215 to the per-file write page cache data structure 220 may be accomplished by moving, from the per-group unified read page cache data structure 215 to the per-file write page cache data structure 220, the pointers to the affected pages 225. The moving of the pointers may involve adding, to the per-file write page cache data structure 220, pointers to the affected pages 225, and removing, from the per-group unified read page cache data structure 215, the pointers to the affected pages 225.

If the cache pages 225 referenced by the per-file write page cache data structure 220 are subsequently synchronized with persistent storage (e.g., flushed to persistent storage using a "fsync" command, in a Linux environment), then the inode may be unlocked and the cached pages 225 may be moved to the per-group unified read page cache data structure 215 (as shown by the arrow 235 in FIG. 2). The moving of the pages 225 from the per-file write page cache data structure 220 to the per-group unified read page cache data structure 215 may be accomplished by moving, from the per-file write page cache data structure 220 to the per-group unified read page cache data structure 215, the pointers to the affected pages 225.

Figure 3:
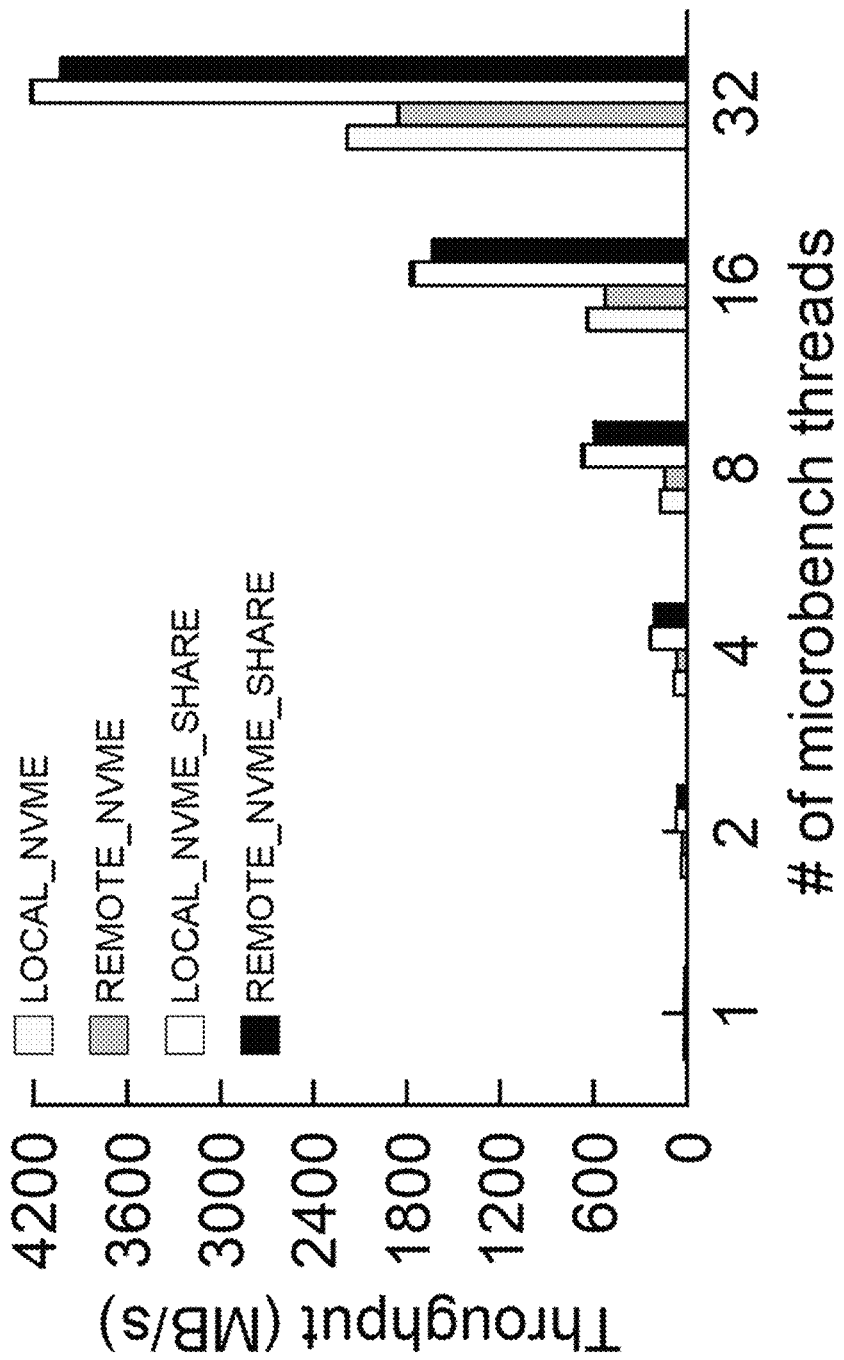
FIG. 3 is a graph of results of an experiment, according to an embodiment of the present disclosure.

Performance improvements achievable in some embodiments were estimated using an experiment with 32 threads as follows. FIG. 3 is a graph of the throughput measure, in various circumstances, in this experiment (as well as the results of analogous experiments with fewer threads (1, 2, 4, 8 and 16 threads)). The I/O size for each read was 4 kilobytes (KB), and before the experiment was run, the page cache was flushed. The persistent storage was either Non-volatile Memory Express (NVME) (or "local NVME") or NVME over Fabrics (NVME-oF) (or "remote NVME"). In a first test, 32 threads were programmed to randomly read from private files (each having a size of 1 gigabyte (GB)). The measured throughput is shown in FIG. 3, in bars identified in the legend of FIG. 3 as "LOCAL_NVME" and as "REMOTE_NVME". In a second test, 32 threads were programmed to randomly read from a 32 GB shared file; these threads performed read operations at any location in the file. In a third test, 32 threads were programmed to randomly read from a 32 GB shared file; each of these threads performed read operations only within a respective portion, or "shard" of the file. The second and third tests were performed both for local NVME and remote NVME connections; the results are in bars identified in the legend of FIG. 3 as "LOCAL_NVME_SHARE" and as "REMOTE_NVME_SHARE", respectively (in each case the difference in performance between the second and third tests was insignificant). It was found that during the experiment the cache hit rate was 47.3% for threads reading from private files, 89.7% for threads reading from a shared file (with each thread reading from a random read location in the file) and 90.2% for threads reading from a shared file (with each thread reading from its respective portion of the file).

Figure 4:
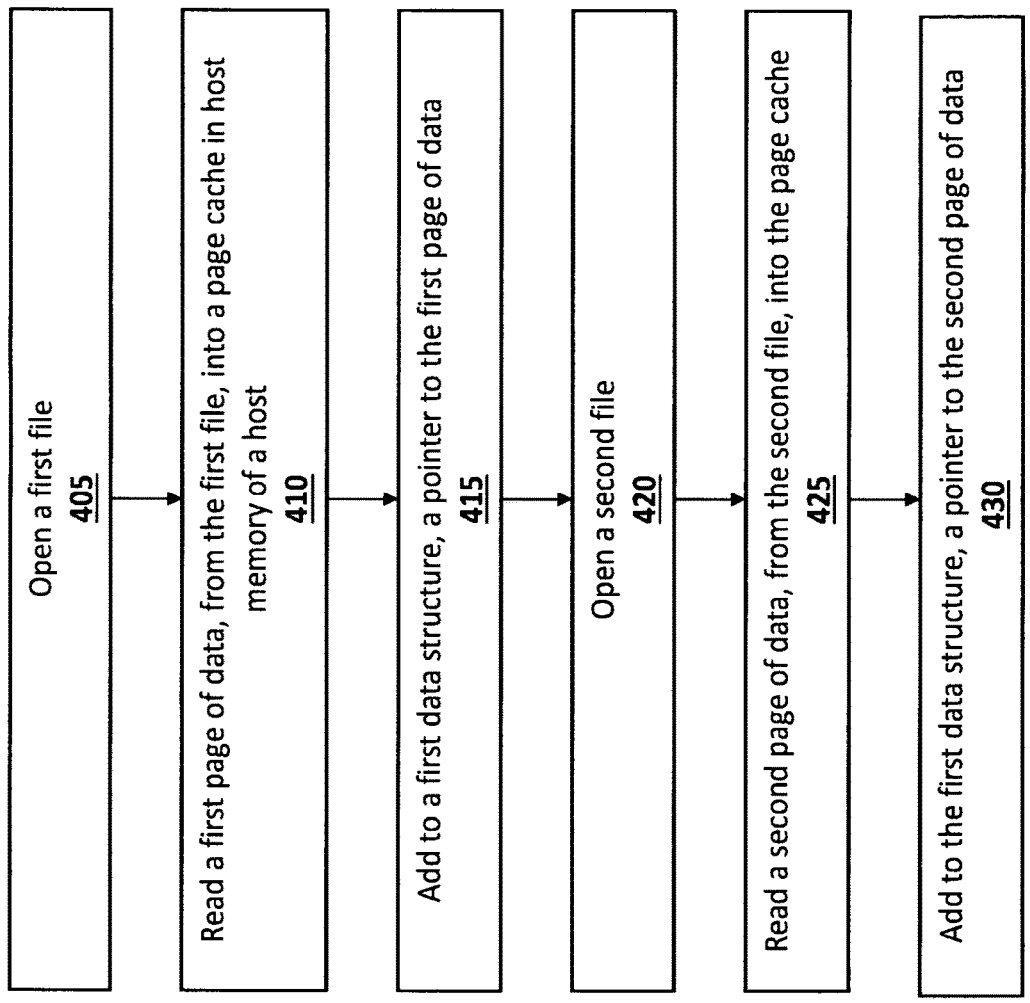
FIG. 4 is a flow chart of a method for caching, according to an embodiment of the present disclosure.

FIG. 4 is a flow chart of a method. In some embodiments, the method includes opening a first file, at 405, by a first thread; reading, at 410, a first page of data, from the first file, into a page cache in host memory of a host; adding, at 415, to a first data structure (which may be a per-group unified read page cache data structure 215) a pointer to the first page of data; opening, at 420, a second file, by a second thread; reading, at 425, a second page of data, from the second file, into the page cache; and adding, at 430, to the first data structure, a pointer to the second page of data.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second quantity is "within Y" of a first quantity X, it means that the second quantity is at least X−Y and the second quantity is at most X+Y. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for caching in storage devices have been specifically described and illustrated herein, many modifications and variations will be apparent to those skilled in the art. Accordingly, it is to be understood that a system and method for caching in storage devices constructed according to principles of this disclosure may be embodied other than as specifically described herein. The invention is also defined in the following claims, and equivalents thereof.

What is claimed is:

1. A method, comprising:
  opening a first file, by a first thread; reading a first page of data, from the first file, into a page cache in host memory of a host; adding, to a first data structure, a first pointer, the first pointer pointing to the first page of data; opening a second file, by a second thread; reading a second page of data, from the second file, into the page cache; adding, to the first data structure, a second pointer, the second pointer pointing to the second page of data; and reading, by the first thread, the second page of data from the page cache.

2. The method of claim 1, further comprising:
  modifying, by the host, data in the first page of data; and
  moving the first pointer to a second data structure, different from the first data structure.

3. The method of claim 2, further comprising:
  flushing the first page to the first file; and
  moving the first pointer to the first data structure.

4. The method of claim 1, further comprising:
  grouping the first file and the second file into a first group according to a criterion, wherein the page cache is associated with the first group.

5. The method of claim 4, wherein the page cache is part of a memory budget of the first group.

6. The method of claim 1, wherein the first file is within a first directory, and the second file is within the first directory.

7. The method of claim 1, further comprising receiving a request, from the second thread, to group the second file with the first file.

8. The method of claim 1, further comprising:
  opening a third file, by the first thread;
  reading a third page of data, from the third file, into the page cache; and
  adding, to a first data structure, a pointer to the third page of data.

9. The method of claim 8, further comprising receiving a request, from the first thread, to group the third file with the first file.

10. A system, comprising:
  a processing circuit; and
  memory, operatively connected to the processing circuit and storing instructions that, when executed by the processing circuit, cause the system to perform a method, the method comprising:
    opening a first file, by a first thread;
    reading a first page of data, from the first file, into a page cache in host memory of a host;
    adding, to a first data structure, a first pointer, the first pointer pointing to the first page of data;
    opening a second file, by a second thread;
    reading a second page of data, from the second file, into the page cache;
    adding, to the first data structure, a second pointer, the second pointer pointing to the second page of data; and
    reading, by the first thread, the second page of data from the page cache.

11. The system of claim 10, wherein the method further comprises:
  modifying, by the host, data in the first page of data; and
  moving the first pointer to a second data structure, different from the first data structure.

12. The system of claim 11, wherein the method further comprises:
  flushing the first page to the first file; and
  moving the first pointer to the first data structure.

13. The system of claim 10, further comprising:
  grouping the first file and the second file into a first group according to a criterion, wherein the page cache is associated with the first group.

14. The system of claim 13, wherein the page cache is part of a memory budget of the first group.

15. The system of claim 10, wherein the first file is within a first directory, and the second file is within the first directory.

16. The system of claim 10, wherein the method further comprises receiving a request, from the second thread, to group the second file with the first file.

17. The system of claim 10, wherein the method further comprises:
  opening a third file, by the first thread;
  reading a third page of data, from the third file, into the page cache; and
  adding, to a first data structure, a pointer to the third page of data.

18. The system of claim 17, wherein the method further comprises receiving a request, from the first thread, to group the third file with the first file.

19. A system, comprising:
  means for processing; and
  memory, operatively connected to the means for processing and storing instructions that, when executed by the means for processing, cause the system to perform a method, the method comprising:
    opening a first file, by a first thread;
    reading a first page of data, from the first file, into a page cache in host memory of a host;
    adding, to a first data structure, a first pointer, the first pointer pointing to the first page of data;
    opening a second file, by a second thread;
    reading a second page of data, from the second file, into the page cache;
    adding, to the first data structure, a second pointer, the second pointer pointing to the second page of data; and
    reading, by the first thread, the second page of data from the page cache.

20. The system of claim 19, wherein the method further comprises:
  modifying, by the host, data in the first page of data; and
  moving the first pointer to a second data structure, different from the first data structure.

* * * * *